Oct. 21, 1969     F. W. HOLT     3,473,312
FRUIT PICKER
Filed Jan. 18, 1967     2 Sheets-Sheet 1
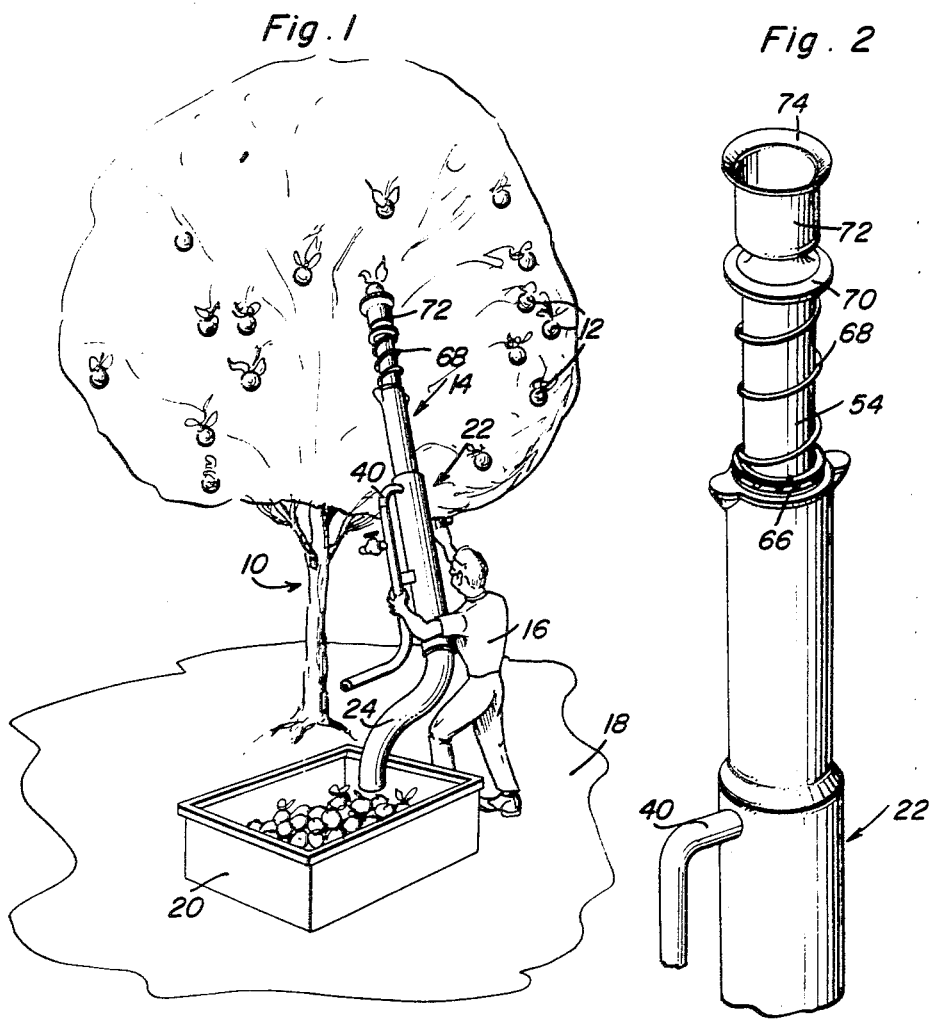
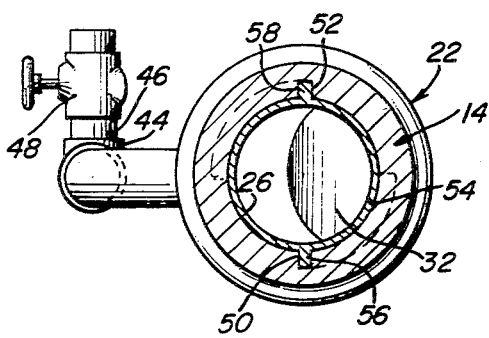
Frank W. Holt
INVENTOR.

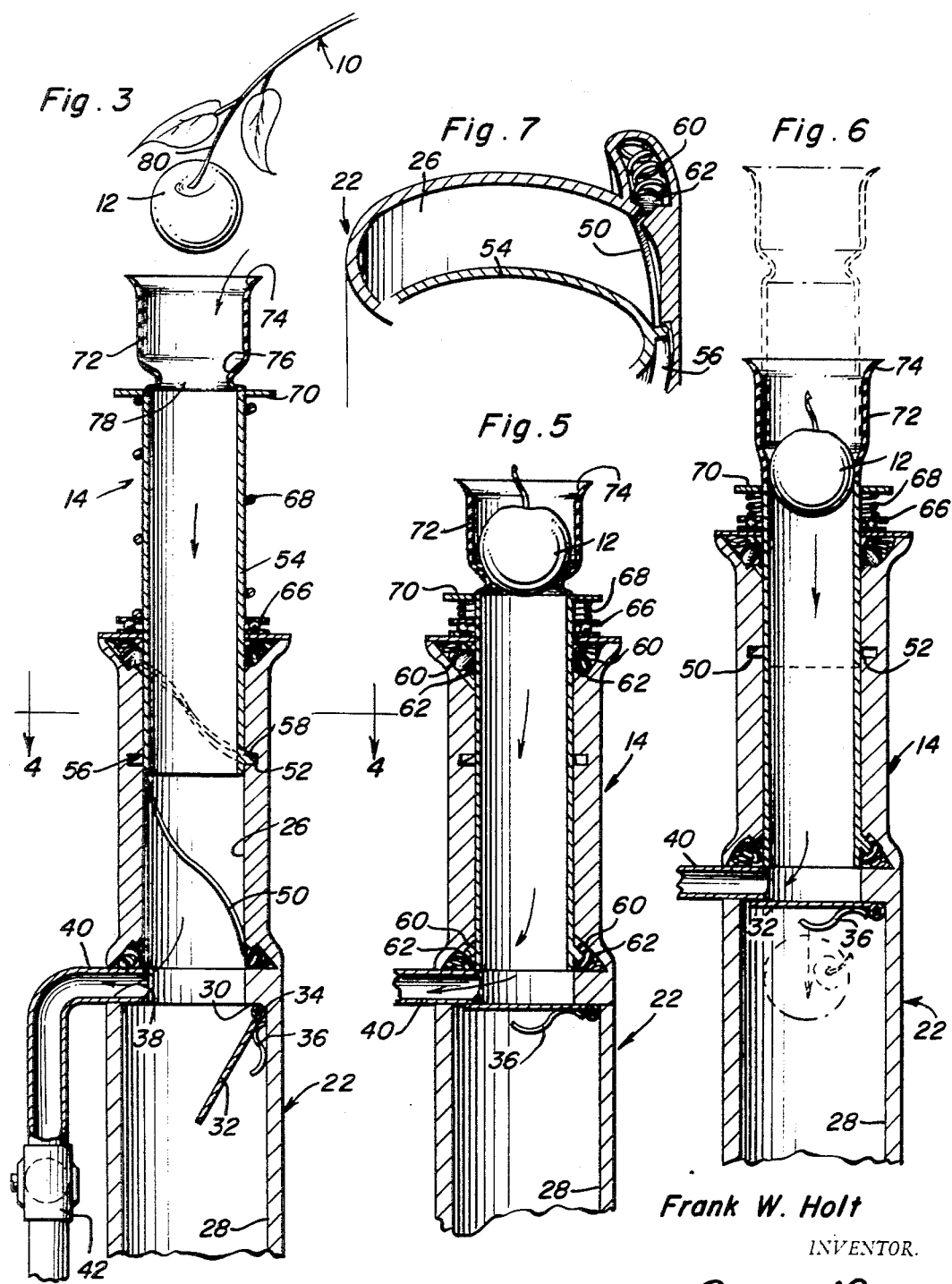

3,473,312
FRUIT PICKER
Frank W. Holt, Palm City, Fla.
(P.O. Box 1814, Stuart, Fla. 33494)
Filed Jan. 18, 1967, Ser. No. 610,147
Int. Cl. A01g *19/08*
U.S. Cl. 56—332                                 12 Claims

ABSTRACT OF THE DISCLOSURE

A tube-like member having one end adapted to be advanced toward fruit which is to be picked and to have air rapidly drawn thereinto with the one end of the tube including a zone of reduced cross-sectional area adapted to wedgingly receive fruit drawn into the tube. The tube is supported for longitudinal sliding reciprocation relative to a suitable supporting member and is yieldingly urged toward one limit position of longitudinal movement in which the one end of the tube is advanced. The tube is operatively supported from the support member in a manner such that the wedging engagement of a piece of fruit in the reduced zone thereof will cause movement of the tube relative to the support member toward the other limit position while simultaneously effecting rotation of the tube relative to the support member about its longitudinal axis.

---

The fruit picker of the instant invention is adapted to be hand carried or suitably supported from any suitable mobile support and is operable to frictionally grip and then pull and simultaneously twist fruit from its supporting stem or branch.

In the past there have been many various types of fruit pickers utilized in picking fruit such as oranges, peaches and apples as well as other similar shaped fruit but most of these pickers have included structural and/or operational characteristics which tend to damage either the fruit being picked or the trees from which the fruit is being picked.

It is accordingly the main object of this invention to provide a fruit picker which will be capable of gripping and then pulling and twisting fruit from its supporting stem in a manner involving gentle handling of the fruit being picked and without inflicting any damage to the tree from which the fruit is being picked.

Another object of this invention, in accordance with the immediately preceding object, is to provide a fruit picker which may be readily operated by a workman standing on the ground or movably supported from a suitable vehicle and operated by a workman also supported from the vehicle.

Yet another object of this invention is to provide a fruit picker which will readily adapt itself automatically for picking various size pieces of fruit.

Another object of this invention is to provide a vacuum actuated fruit picker constructed in a manner whereby the effective vacuum with which the picker is operatively communicated may be readily varied so as to at least partially vary the operation of the picker according to the fruit being picked.

A final object of this invention to be specifically enumerated herein is to provide a fruit picker in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

FIGURE 1 is a perspective view of a fruit tree with the fruit picker of the instant invention being operatively supported adjacent the tree by a workman standing upon the ground and with a receptacle being disposed on the ground adjacent the workman to receive the fruit picked from the tree;

FIGURE 2 is a fragmentary enlarged perspective view of the upper portion of the fruit picker;

FIGURE 3 is an enlarged fragmentary longitudinal vertical sectional view taken substantially upon a plane passing through the center line of the assemblage illustrated in FIGURE 2;

FIGURE 4 is a horizontal sectional view taken substantially upon the plane indicated by the section line 4—4 of FIGURE 3;

FIGURE 5 is a view similar to FIGURE 3 but illustrating the relative positions of the fruit picker as the piece of fruit being picked is being moved toward its final position during pulling and twisting of the piece of fruit from its supporting stem and prior to the picked piece of fruit passing downwardly through the picker;

FIGURE 6 is a view similar to FIGURE 5 but illustrating the picked fruit in position beginning to pass downwardly through the picker after having been pulled from its supporting stem and prior to the movable portions of the picker returning to the positions thereof illustrated in FIGURE 3; and FIGURE 7 is a fragmentary perspective view of the upper portion of the fruit picker illustrating one of the stop springs for the reciprocal sleeve portion of the picker and with portions of the sleeve portion and supporting tubular member of the picker being broken away and illustrated in horizontal section.

Referring now more specifically to the drawings the numeral 10 generally designates a fruit tree upon which pieces of fruit 12 are disposed and from which the fruit 12 is to be picked. The fruit picker of the instant invention is generally referred to by the reference numeral 14 and is manually supported by a workman 16 standing on the ground 18 and having a fruit receptacle 20 disposed alongside him for receiving the fruit 12 picked from the tree 10.

The fruit picker 14 includes an elongated tubular member or body referred to in general by the reference numeral 22 and having a fruit outlet duct 24 operatively associated with one end thereof for receiving fruit discharged from the tubular member or body 22 and conveying the picked fruit to the receptacle 20.

The tubular member or body 22 has a bore 26 formed therethrough including a counterbore 28 at one end into which the inlet end of the tubular outlet duct 24 is telescopingly secured in any convenient manner. The upper end of the counterbore 28 is defined by an annular shoulder 30 separating the bore 26 from the counterbore 28 and a flap valve member 32 is pivotally supported from the tubular member or body 22 as at 34 and has a spring 36 operatively associated therewith for yieldingly urging the flap valve member 32 from the open position thereof illustrated in FIGURE 3 of the drawings to the closed position thereof illustrated in FIGURES 5 and 6 of the drawing.

The tubular member or body 22 has a transverse opening 38 formed therein immediately above the shoulder 38 in which the inlet end of an air outlet passage or conduit 40 is secured. The air outlet passage or conduit 40 has a T-fitting 42 disposed therein whose lateral tubular neck portion 44 has the outlet end of a branch pipe 46 secured therein, the branch pipe 46 including a bleed air inlet control valve 48.

The bore 26 is provided with diametrically opposite spiral grooves 50 and 52 and one end portion of a sleeve 54 is telescoped into the end of the bore 26 remote from the counterbore 28 and includes diametrically opposite spiral ribs 56 and 58 disposed in the grooves 50 and 52 whereby longitudinal reciprocation of the sleeve 54 within the bore 26 will cause oscillation of the sleeve 54 about its longitudinal axis.

The ribs 56 and 58 extend only approximately one-half way about the sleeve 54 and the upper and lower ends of each spiral groove 50 and 52 open into short circumferentially extending sockets 60 formed in the tubular member or body 22 and having spring-urged pistons 62 disposed therein for engagement by the upper and lower ends of the ribs 56 and 58 so as to define the upper and lower limits of reciprocation of the sleeve 54 illustrated in FIGURES 3 and 5, respectively. The spring-urged pistons 62 of course absorb some of the stopping shock of the reciprocal and oscillatory movement of the sleeve 54.

The sleeve 54 projects outwardly of the adjacent end of the tubular member or body 22 and an annular bearing 66 rests against the end face of the tubular body 22 and a compression spring 68 is disposed about the extended end of the sleeve 54 and has its opposite ends engaged with the bearing 66 and a stop flange 70 carried by the outer terminal end of the sleeve 54.

The terminal end of the sleeve 54 disposed outwardly of the tubular body 22 has a cup 72 secured thereto as an integral portion of the sleeve 54 and the free end of the cup 72 is flared as at 74 while the base end thereof which opens into the free terminal end of the sleeve 54 has a single circumferential corrugation 76 formed therein defining a zone 78 of reduced cross-sectional area, the cup 72 being constructed of stiff but somewhat flexible and resilient material.

In operation, the picker 14 may be supported by the workman 16 in a manner so as to advance the cup 72 toward a piece of fruit 12 to be picked from the tree 10. The outlet end of the conduit 40 is communicated with any suitable source of vacuum and the bleed air inlet valve 48 may be adjusted as desired so as to obtain the desired amount of inflow of air into the cup 72. Then, as the cup 72 is advanced toward the fruit 12, the latter is drawn into the free flared end of the cup 72 and is wedgingly seated in contact with the corrugation 76 in the zone 78. Wedging of the fruit 12 in the zone 78 closes the outer end of the sleeve 54 and therefore a vacuum builds up in the sleeve 54 whereupon atmospheric pressure will push the sleeve 54 inwardly to the position thereof illustrated in FIGURE 5 of the drawings against the compression spring 68. As soon as the sleeve 54 reaches its innermost position of travel illustrated in FIGURE 5, the inward movement of the sleeve 54 is stopped and the inertia of the fruit 12 forces the latter through the zone 78 slightly expanding the corrugation 76 so that the fruit 12 is free to fall downwardly upon the closed flap valve member 32 thus causing the latter to open and enabling the fruit 12 to pass by the valve member 32 before the latter is again swung to the closed position. As the fruit 12 is falling from the zone 78 toward the flap valve member 32, the compression spring 68 urges the sleeve 54 to the position thereof illustrated in FIGURE 3 of the drawings in readiness for picking another piece of fruit 12 from the tree 10. Of course, inward movement of the sleeve 54 after the fruit 12 has been seated in the zone 78 effects rotational movement of the sleeve 54 about its longitudinal axis and therefore simultaneously pulls on the fruit 12 and twists the latter so as to more readily separate the fruit 12 from its supporting stem 80.

It may therefore be seen that there are no moving parts of the fruit picker except those which move intermittently for only an extremely short period of time while each piece of fruit 12 is being picked. Therefore, in addition to the fruit picker 14 gently handling the fruit 12 being picked, the fruit picker 14 is not likely to damage any adjacent portions of the tree 10.

Although it has been previously stated that the inertia of the fruit 12 forces the latter through zone 78, the differential in air pressure in the sleeve 54 above and below the fruit 12 wedged in zone 78 is always acting upon the fruit 12 and therefore it is the additional force of the inertia of the fruit 12 combined with the greater air pressure pushing down on the fruit that forces the latter through the zone 78 as the sleeve 54 reaches its furthermost downward position of movement.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A fruit picker for gripping and then pulling fruit from its supporting stem or branch, said picker including a support member, an elongated sleeve mounted on said support member for longitudinal reciprocation between two limit positions, means connected between said support member and said sleeve yieldingly urging said sleeve toward one of said limit positions, one end portion of said sleeve being adapted for communication with a suitable source of vacuum, the other end portion including a zone of reduced cross-sectional area spaced from the terminal end thereof adapted to initially have fruit to be picked snugly and wedgingly seated therein and thereafter forced therethrough, whereby fruit to be picked may be sucked into said terminal end and subsequently wedgingly gripped in said zone so as to thereby close said one end portion, said sleeve being in communication with said source of vacuum in a manner such as to cause movement of said sleeve to the other limit position upon closing of said other end portion, whereby once said zone has had a piece of fruit wedgingly engaged therein said sleeve will shift to said other limit position and the sudden stopping of said sleese in said other limit position will cause the interia of the picked piece of fruit to move it through said zone and said sleeve may be subsequently urged back toward said one limit position.

2. The combination of claim 1 wherein the portion of said sleeve defining said zone is constructed of stiff but somewhat flexible material.

3. The combination of claim 1 including means operatively connected between said sleeve and said support member operative to cause oscillation of said sleeve about its longitudinal axis in response to reciprocation of said sleeve relative to said support member.

4. The combination of claim 1 wherein said support member comprises a tubular member including a first end portion with which said sleeve is telescopically engaged for extension and retraction thereof relative to said first end portion.

5. The combination of claim 4 wherein said tubular member includes an air passage opening thereinto intermediate its opposite ends with which the interior of said sleeve is communicated and by which said tubular member is adapted for communication with said source of vacuum.

6. The combination of claim 5 wherein said tubular member includes a flap type gate valve intermediate the ends thereof and on the side of said opening remote from said first end portion thereof adapted to permit the passage thereby of fruit moving from said first end portion and to at least substantially block the passage of air through said tubular member from the other end portion thereof to said first end portion thereof when there is no fruit moving past said gate valve.

7. The combination of claim 1 wherein said support member comprises a tubular member including a first end portion with which said sleeve is telescopically engaged for extension and retraction thereof relative to said first end portion, said tubular member including an air passage opening thereinto intermediate its opposite ends with which the interior of said tubular member and sleeve are in communication with said source of vacuum, said air passage having a variable air flow bleed air inlet operatively associated therewith whereby the effective vacuum of said source of vacuum with which said air passage is communicated may be varied.

8. In combination with a support, an elongated vacuum tube, said tube including inlet and outlet ends and through which picked fruit is adapted to be passed, said tube being supported on said support for limited longitudinal reciprocation relative thereto, a fruit picking cup, carried by the inlet end of said tube including an outer inlet end and an outlet end secured to said inlet end of said tube, said cup including a zone of reduced internal cross-sectional area defined by a portion of said cup constructed of stiff but somewhat flexible and resilient material, said zone being adapted to loosely wedgingly receive therein fruit drawn into the outer inlet end of said cup and to frictionally grip said fruit against further movement through said cup until said tube and said cup are shifted longitudinally so as to advance the outlet end of said tube and then suddenly stopped so as to enable the inertia of the fruit to force it through said zone.

9. The combination of claim 8 wherein said zone is defined by a circumferentially extending inwardly directed corrugation formed in said cup.

10. A fruit picker comprising a support adapted for adjusted stationary positioning relative to fruit which is to be picked, fruit engaging means slidingly supported by said support for reciproaction relative thereto between first and second limit positions along a predetermined path, said fruit engaging means including means for frictionally gripping the outer periphery of a piece of fruit to be picked, said fruit picker including drive means operative, in response to a piece of fruit being gripped by said fruit engaging means, to quickly automatically shift said fruit engaging means from said first position to said second position for abrupt stopping in the latter, said fruit engaging means being ineffective to overcome the inertia of said fruit as said fruit engaging means is abruptly stopped in said second position and thereby operative to release said fruit for its continued movement along said path and means connected between said support and fruit engaging means operative, upon disengagement of said fruit from said fruit engaging means, to return said fruit engaging means to said first position.

11. The combination of claim 8 wherein said cup is of an axial length from said outer inlet end to said zone appreciably greater than the radius of said cup.

12. The combination of claim 11 wherein said cup is supported for oscillation about its longitudinal center axis automatically in response to longitudinal reciprocation of said cup.

References Cited
UNITED STATES PATENTS

| | | | |
|---|---|---|---|
| 492,824 | 3/1893 | McLean | 56—332 |
| 2,545,072 | 3/1951 | Denman | 56—332 |
| 2,680,338 | 6/1954 | Space | 56—13 |
| 2,711,625 | 6/1955 | Bullock | 56—332 |
| 2,775,088 | 12/1956 | Bullock | 56—332 |
| 2,968,907 | 1/1961 | Bernheim et al. | 56—332 |
| 3,165,880 | 1/1965 | Buie | 56—336 |
| 3,200,575 | 8/1965 | Hurst | 56—328 |

RUSSELL R. KINSEY, Primary Examiner